(12) United States Patent
Gillet et al.

(10) Patent No.: US 8,361,377 B2
(45) Date of Patent: Jan. 29, 2013

(54) EQUIPMENT FOR BLOWING VESSELS OF A THERMOPLASTIC MATERIAL

(75) Inventors: Denis Gillet, Octeville-sur-Mer (FR); Regis Leblond, Octeville-sur-Mer (FR); Alexandre Toutoux, Octeville-sur-Mer (FR); Didier Santais, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 385 days.

(21) Appl. No.: 12/680,229

(22) PCT Filed: Sep. 25, 2008

(86) PCT No.: PCT/FR2008/051715
§ 371 (c)(1), (2), (4) Date: Mar. 26, 2010

(87) PCT Pub. No.: WO2009/050377
PCT Pub. Date: Apr. 23, 2009

(65) Prior Publication Data
US 2010/0301523 A1    Dec. 2, 2010

(30) Foreign Application Priority Data

Sep. 27, 2007  (FR) ..................... 07 06782

(51) Int. Cl.
*B29C 49/62* (2006.01)
*B29C 49/64* (2006.01)
(52) U.S. Cl. ......... 264/526; 264/523; 425/526; 425/535
(58) Field of Classification Search .................. 425/526, 425/535; 264/523, 526
See application file for complete search history.

(56) References Cited

U.S. PATENT DOCUMENTS 3,233,416 A * 2/1966 Rainwater et al. ................. 62/5
(Continued)

FOREIGN PATENT DOCUMENTS
DE    36 14 229 A1   11/1987
(Continued)

OTHER PUBLICATIONS

International Search Report for PCT/FR2008/051715, dated Apr. 27, 2009.

*Primary Examiner* — Robert B Davis
(74) *Attorney, Agent, or Firm* — Sughrue Mion, PLLC

(57) ABSTRACT

The invention relates to blowing equipment (1) that uses a pressurised fluid for blowing vessels from preforms of a thermoplastic material and including a body (3) and a neck (6), wherein said equipment comprises a blowing mould (5) with a moulding cavity (4) in which the body (3) of a preform (2) can be placed, said mould (5) including an upper surface (7) from which protrudes the neck (6) of a preform (2) once the body (3) of said preform (2) is placed in the cavity (4), and wherein said equipment (1) also includes a nozzle (8) with an end (9) shaped so as to be placed in functional sealed relation with the protruding neck (6) of the preform (2). The end (9) of the nozzle (8) is connected to a means (12) for degassing the blowing fluid, capable of bearing tightly on the upper surface (7) of the mould (5) so as to define an inner volume (13) in which the blowing fluid blown under pressure into the preform (2) can be discharged after the preform (2) blowing operation. The equipment includes a degassing means capable of expanding the blowing fluid around the blowing cavity, wherein said means includes a plurality of channels (28) arranged around said blowing cavity, said channels (28) having one side opening into the inner volume of the degassing means (12) while the other side gives into an annular channel (29) for discharge into the atmosphere.

11 Claims, 2 Drawing Sheets

U.S. PATENT DOCUMENTS

| | | |
|---|---|---|
| 6,464,486 B1 | 10/2002 | Barray et al. |
| 7,674,108 B2 | 3/2010 | Lemaistre |
| 2008/0136068 A1* | 6/2008 | Leone .......................... 264/520 |

FOREIGN PATENT DOCUMENTS

| | | |
|---|---|---|
| DE | 100 63 553 A1 | 7/2002 |
| FR | 2 764 544 A1 | 12/1998 |
| FR | 2 872 082 A1 | 12/2005 |
| WO | 2005/123357 A2 | 12/2005 |

* cited by examiner

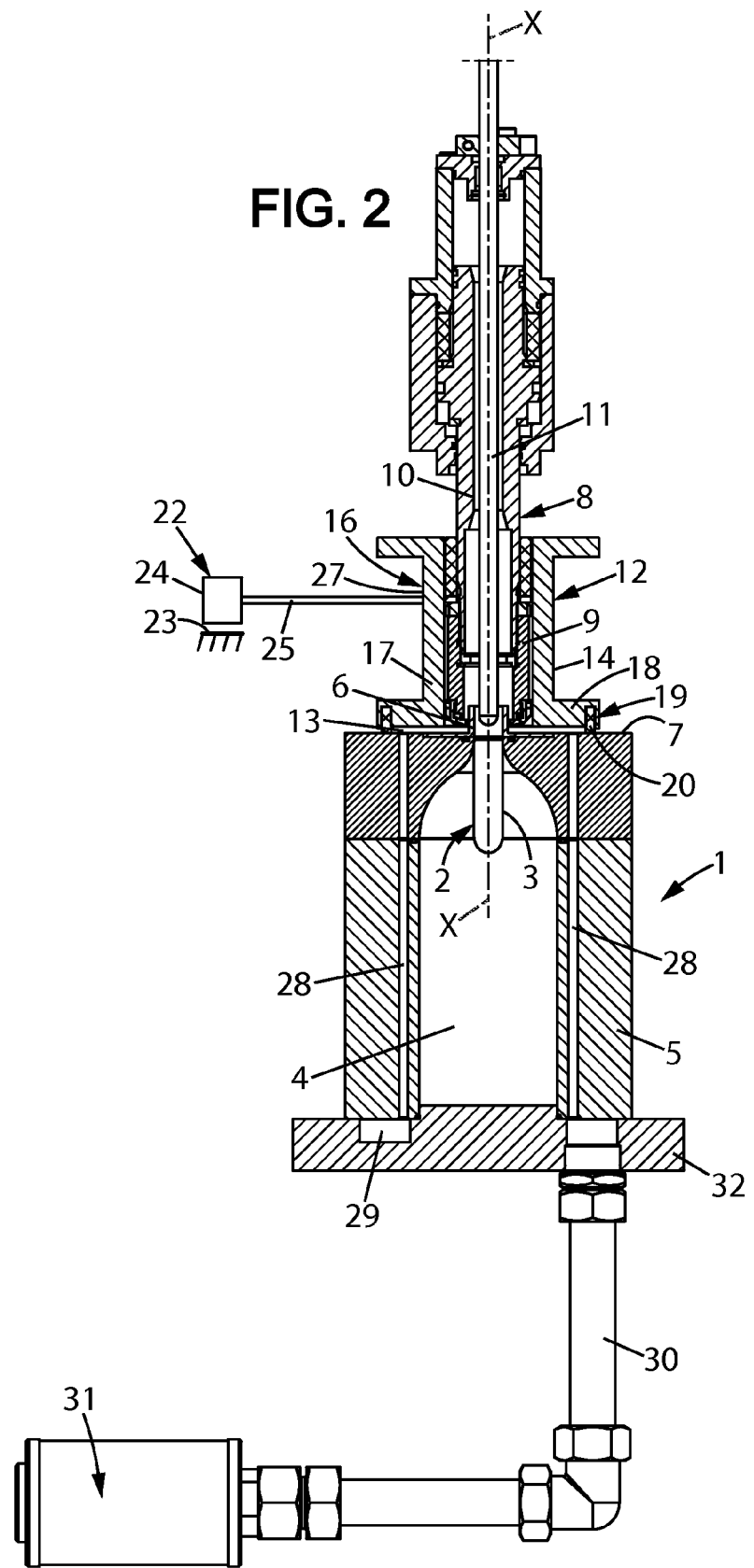

EQUIPMENT FOR BLOWING VESSELS OF A THERMOPLASTIC MATERIAL

FIELD OF THE INVENTION

This invention generally relates to the field of manufacturing vessels made of thermoplastic material, such as PET or PEN, via a blowing or drawing-blowing process using a preform (such as a preform or an intermediary vessel), and it relates more precisely to improvements made to blowing equipment, using a pressurized fluid, of vessels using preforms made of thermoplastic material of which the body is enclosed in a blowing mold and which were heated beforehand in a temperature condition oven, said equipment comprising a nozzle comprising an end shaped so as to be placed in sealed functional relation with the neck of the preform.

DESCRIPTION OF THE PRIOR ART

In a known manner, entirely or partially, axially above the blowing mold between a high position or raised position wherein the nozzle is not functional (opening and closing of the mold allowing for the loading of a preform and the unloading of the molded vessel) and a low position or blowing position wherein the end of the nozzle cooperates in a sealed manner either with the neck of the preform, or with the face of the mold above which protrudes the neck of the preform and wherein low position said nozzle is functional.

Blowing equipment is known wherein the end of the nozzle, in functional position, cooperates positively with the neck of the preform and is either abutted in a sealed manner against the locking ring (edge) of the neck of the preform, or is fitted in a sealed manner in or on the neck of the preform.

Blowing equipment is also known wherein the end of the nozzle is of a bell shape larger than the neck of the preform and covers the latter by pressing frontally, in a sealed manner, against the face of the mold whereon the neck of the preform protrudes (see for example FR 2 764 544).

A blowing sequence normally comprises a pre-blowing phase of the preform using a fluid (in general air) under a medium pressure (for example $12 \times 10^5$ Pa), then a blowing phase properly speaking under a high pressure (for example $40 \times 10^5$ Pa) generally accompanied by a mechanical axial drawing using a drawing head and, finally, a discharge phase with the discharge of the pre-blowing/blowing air.

It is known according to prior art, and in particular in FR 2 872 082, in the name of Applicant, to provide a blowing equipment comprising several solenoid valves for the putting into selective liaison of the nozzle, and for which three respective solenoid valves are controlled sequentially which, on one side, are connected respectively to a source of fluid under medium pressure, to a source of fluid under high pressure and to a discharging and which, on the other side, are connected to the nozzle.

However, the system for controlling the discharge via a solenoid valve adds a complexity in controlling the method of blowing and increases the manufacturing costs of such blowing equipment.

It is indeed necessary to provide the means of discharging the blown fluid under pressure at the end of the blowing cycle or otherwise cause a load rattling during this discharging which, other than the problems of sound disturbance, risks damaging the blowing equipment as well as the vessel which has just been blown.

DE 100 63 553 shows a blowing equipment, using a presurized fluid, of vessels using preforms, made of thermoplastic material and comprising a body and a neck.

This equipment comprises a blowing mold with a molding cavity wherein is able to be placed the body of a preform, said mold having an upper surface from which is able to protrude the neck of a preform, once the body of said preform placed in the cavity.

The equipment further comprises a head, or nozzle, for blowing with an end shaped in order to be placed in functional sealed relation with the neck of the protruding preform.

The end of the nozzle is attached to means of degassing the blowing fluid, means of which are in the shape of a bell, capable of bearing tightly on the upper surface of mold by forming an inner volume wherein the blowing fluid blown under pressure in the preform expands after the blowing operation of the preform, i.e. during the so-called degassing operation, and it is discharged towards the exterior through an absorbing member acting as a silencer.

This equipment suppresses the degassing solenoid valve and does not require the passing of the discharge fluid through the blowing nozzle.

For some applications, it is interesting to be able to maintain the mold at a constant temperature, more preferably lower than that of the preforms.

SUMMARY OF THE INVENTION

This invention makes possible, with relatively simple means, to satisfy this requirement by using means of producing the vessels, i.e. the blowing fluid.

In order to conjugate the degassing (discharging of the blowing fluid) and the air conditioning of the mold, the equipment according to the invention comprises, in addition to what has been detailed previously in liaison with prior art, means of degassing which consist in an arrangement of the mold making it possible to carry out an expansion of the blowing fluid around the blowing cavity, mold comprising a plurality of channels arranged around said blowing cavity, channels which are provided, on one side, opening into the inner volume of the means of degassing and, on the other side, opening into an annular channel which allows for the discharging of said blowing fluid towards the atmosphere.

According to an advantageous embodiment of the means of degassing according to the invention, said means of degassing comprises a body which comprises: —a substantially cylindrical central section sealingly surrounding the end of the nozzle and—a substantially planar radial crown having the means of protruding sealing able to bearing tightly on the upper surface of the mold, and this thanks to which the inner volume of the means of degassing, of discoidal shape, is delimited by said radial crown, by said means of sealing and by said upper surface of the mold.

In order to form an inner closed and sealed volume, the means of degassing include means of sealing capable of bearing on the upper surface of the mold, means of sealing having the form of a sealing skirt made from an elastic material, such as rubber or polyurethane.

In order to control the forming of the inner volume according to the tight attaching of the nozzle with the neck of the preform, the means of degassing are able to be displaced axially by means of controlling.

Advantageously, the means of controlling have the form of a cam and of a bearing roller able to be displaced on said cam.

According to a second advantageous embodiment of the means of controlling, said means of controlling have the form of a cylinder.

In order to allow for a uniform cooling of the blowing mold, the discharging channels are regularly hollowed in the blowing mold concentrically to the blowing axis of the nozzle.

According to an advantageous embodiment, the annular channel in which the channels open, is formed in the bottom of the blowing mold.

In order to allow the silencer discharge of the blowing fluid, the annular channel is connected to a discharging conduit of the blowing fluid comprising a discharge silencer device.

According to another aspect, this invention relates to a method of blowing using a pressurized fluid of vessels using preforms made of thermoplastic material and comprising a body and a neck, the body of said preform being able to be placed in a molding cavity of a blowing mold belonging to a blowing equipment, said equipment further comprising a blowing nozzle having an end shaped in order to be placed in functional sealed relation with the neck of said protruding preform of the upper surface of said mold, the method comprising at least the following steps of:

placing the preform in the blowing mold;
sealingly attaching the blowing nozzle with the neck of the preform;
blowing the preform;
sealingly unfastening of the nozzle with the neck of the blown vessel;
degassing of the blowing fluid in a closed inner volume formed around the neck of the protruding recipient of the upper surface of the blowing mold;
discharging of the blowing fluid towards the exterior from the closed inner volume;
transferring the blown vessel outside of the blowing mold;
method comprising an additional step of passing the blowing fluid, during degassing, through discharging channels formed in the blowing mold, before said step of discharging of the fluid towards the exterior, discharging being carried out using an annular channel wherein open said channels, via a conduit and a discharge silencer device.

Advantageously, the method comprises a step of forming of the inner closed volume by means of a substantially planar radial crown having protruding means of sealing able to bear tightly on the upper surface of the mold, and this thanks to which said inner volume, in the form of a disc, is delimited by said radial crown, by said means of sealing and by said upper surface of the mold.

BRIEF DESCRIPTION OF THE DRAWINGS

This invention is now described using the examples which are solely for the purposes of illustration and which in no way restrict the scope of the invention, and using the following illustrations, wherein:

FIG. 2 is an axial cross-section diagrammatical view of the blowing equipment according to the invention.

DETAILED DESCRIPTION OF THE INVENTION

Figure 1:
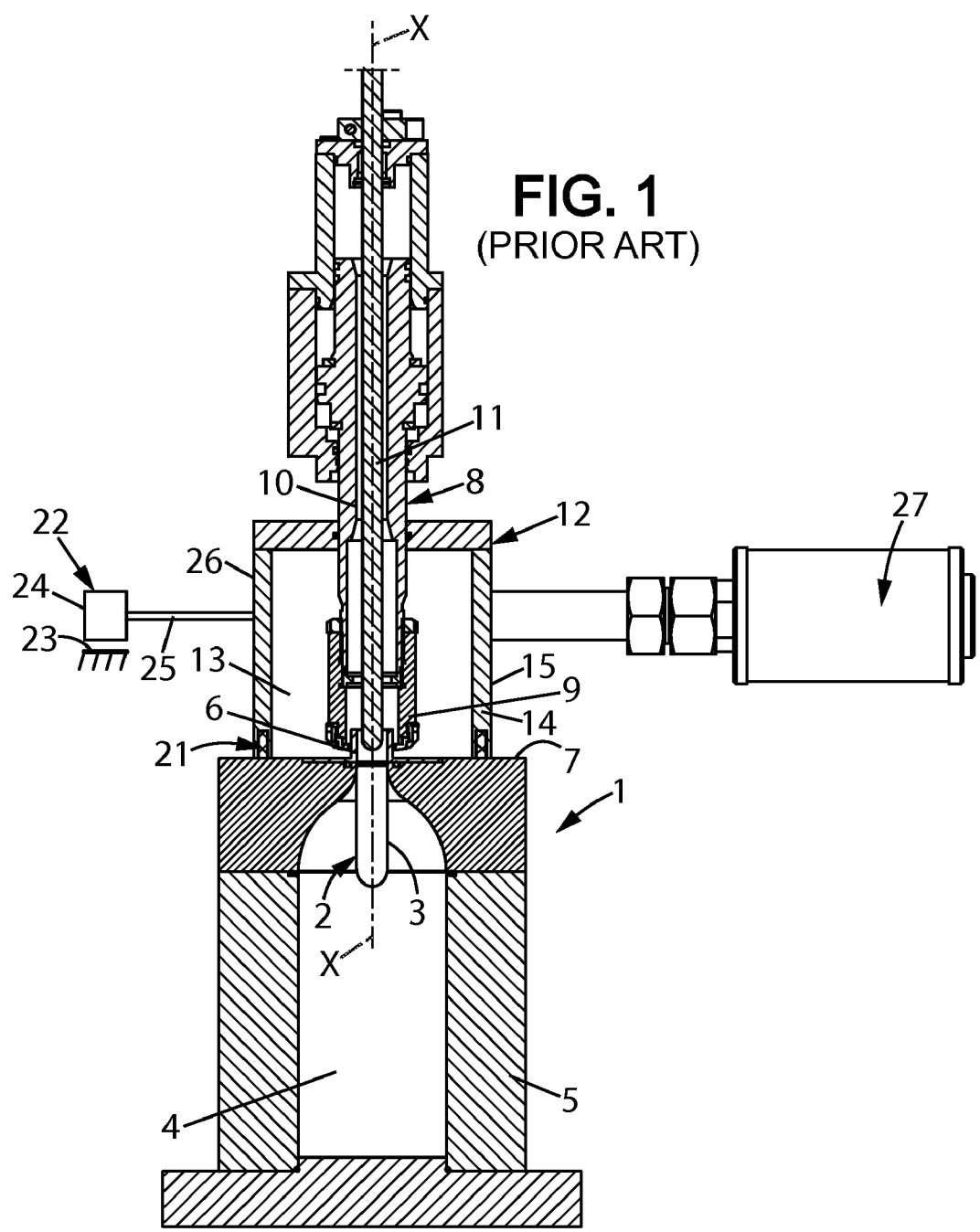
FIG. 1 is an axial cross-section diagrammatical view of a first embodiment of a blowing equipment which corresponds to prior art such as described in aforementioned DE 100 63 553.

In the rest of the description, "preform" means a hollow body having either the form of a preform, i.e. of a substantially axial tubular element with a closed end and an open end having the final form of the neck of the vessel before being blown, or an intermediary vessel, i.e. a preform which has been pre-blown, but which must undergo another blowing operation.

In a manner known per se, the blowing equipment 1 shown in FIG. 1 allows for the blowing of vessels using preforms 2 made of thermoplastic material, preferentially preforms heated beforehand in a temperature condition oven. Each preform 2 comprises a body 3 able to be enclosed in a molding cavity 4 of a blowing mold 5, as well as a neck 6 able to protrude from the upper surface 7 of said mold 5.

The equipment 1 comprises a blowing nozzle 8 which comprises an end 9 (or nozzle nose) shaped in order to be placed in functional sealed relation with the neck 6 of the protruding preform 2, i.e. either by a direct contact of the end 9 of the nozzle 8 with the locking ring of the neck 6 of the preform 2 (the nozzle is then of the locking ring contact type), or by a tight pressing of a bell surrounding the neck 6 of the preform 2 on the upper surface 7 of the mold 5.

The blowing nozzle 8 present an interior cavity 10 wherein is able to be displaced axially a stretching rod 11 (when the latter is present) in order to allow for the stretching of the preform 2 at the time of blowing, the descending movement of the rod 11 inside the blowing cavity 4 being synchronized with the blowing of pressurized fluid inside the preform 2 placed in the mold 5.

The end 9 of the nozzle 8 cooperates with means of degassing 12 of the blowing fluid capable of bearing tightly on the upper surface 7 of the mold 5 and forming an inner volume 13 wherein the blowing fluid blown under pressure in the preform 2 is able to be discharged after the blowing operation of the preform 2. A closed volume 13 is as such formed wherein the pressurized fluid can expand, in light of its discharging. An intermediary discharging is thus formed of the pressurized blown fluid blown before it is discharged towards the atmosphere, and which does not require the controlling of a solenoid valve.

Preferentially, the inner volume 13 is formed at the periphery of the neck 6 protruding from the upper surface 7.

More precisely, the means of degassing 12 are provided surrounding the end 9 of the nozzle and are having the form of a body 14 coaxial to the X-X blowing axis of the nozzle 8.

According to this embodiment of prior art, shown in FIG. 1, the means of degassing 12 have the form of a bell 15 surrounding the end 9 of the nozzle 8 and with an opening directed towards the upper surface 7 of the mold 5 with, at the lower end, means of sealing 21.

According to the embodiment corresponding to the invention, and such as is shown in FIG. 2, the means of degassing 12 comprise a body 16 which comprises: —a central section 17, substantially cylindrical, surrounding in a sealed manner the end 9 of the nozzle 8 and, —a radial crown 18, substantially planar, having protruding means of sealing 19 able to bear tightly on the upper surface 7 of the mold 5, and this thanks to which the inner volume 13 of the means of degassing 12 is delimited by the radial crown 18, by the means of sealing 19 and by the upper surface 7 of the mold 5; this volume 13, of discoidal shape, is similar to the envelope of a thin plate.

More precisely, according to the embodiment shown in FIG. 2, the means of sealing 19 are protruding and have the form of a sealing skirt 20 provided at the periphery of the radial crown 18 of the central body 16 of the means of degassing 12. The radial crown 18 cooperates in a sealed manner with the end 9 of the nozzle 8 and it slides on the latter in such a way as to not be in contact with the upper surface 7 of the mold 5, and as such making it possible to form a closed volume 13 during the putting into sealed contact of the means of sealing 19 on this upper surface 7 of said mold 5.

The means of degassing 12 include means of sealing 19 capable of bearing on the upper surface 7 of the mold 5. These means of sealing 19 have the form of a crown or sealing skirt 20 made of an elastic material, such as rubber or polyurethane, and they allow for the formation of a sealed closed volume 13 during the putting into sealed contact of the means of sealing 19 on the upper surface 7 of the mold 5. As indicated hereinabove, the volume 13 which is delimited by the upper surface 7 of the mold 5, the crown 18 and the skirt 20 which makes a seal, is in the form of a disc or flat plate.

In order to allow for the control of the descending of the means of degassing 12 in the direction of the mold 5 in a manner that is independent of the descending movement of the blowing nozzle 8, the means of degassing 12 are able to be displaced axially using means of controlling 22, for example in the form of a cam 23 and of a bearing roller 24 able to be displaced on said cam 23, or in the form of a cylinder, not shown.

According to a possible embodiment of the means of controlling 22, the bearing roller 24 can be provided at the end of a rod 25 fixed directly on an exterior lateral surface of the means of degassing 12: —either on the exterior lateral surface 26 of the bell 15 (see FIG. 1), —or on the exterior lateral surface 27 of the central section 17 (see FIG. 2).

According to the first form of embodiment, shown in FIG. 1, it is provided, in order to expand and discharge the fluid towards the atmosphere, either to form recesses in the peripheral wall of the bell 15, or to fix an air discharge silencer device 27 on the peripheral exterior lateral surface of the bell 15 through which the expanded air in the inner volume 13 can flow and escape without noise towards the atmosphere.

According to the embodiment of the invention, detailed in FIG. 2, the discharging of the blowing air is carried out in the inner volume 13 of the means of degassing and in the discharging channels 28 arranged in the mold and arranged around the molding cavity 4. These channels 28 extend between the upper surface 7 of the blowing mold 5 and a cavity 29 which communicates with the exterior of the mold via a conduit 30 and a silencer 31. This cavity 29, of annular form, is arranged in the bottom 32 of the mold and acts as a collector for the various channels 28.

Thanks to these channels 28, the degassed blowing fluid of the blown vessel is discharged from the inner volume 13 of the means of degassing 12 by passing through said discharging channels 28 of the blowing mold 5, which makes it possible by the same occasion to cool the blowing mold 5, due to the expanding of the pressurized fluid in these channels 28. The mold 5 indeed has a tendency to heat due to the putting into contact, at the time of blowing, of the heated blown thermoplastic material against the internal wall of the molding cavity 4.

The discharging channels 28 are provided, on one side, opening in the inner volume 13 of the means of degassing 12 and, on the other side, in an annular channel 29 whereon is connected a discharging conduit 30 of the blowing fluid comprising, at the end of said conduit 30, a discharge silencer device 31, of the type known per se, which makes possible the discharging of the blowing fluid towards the atmosphere after the latter is expanded substantially in the discharging channels 28. The volume 13 is arranged in such a way that it is used only as a conduit for the passing of the blowing air between the cavity 4 and the channels 28; the expansion of the blowing air taking place especially in said channels 28.

In order to cool as uniformly as possible the entire mold 5, the discharging channels 28 are regularly hollowed in the blowing mold 5 concentrically to the X-X blowing axis of the nozzle 8.

The blowing air expands between the volume 13 which is of discoidal shape and the annular channel 29 which is formed in the bottom 32 of the blowing mold 5.

According to a second of its aspects, this invention also relates to a blowing method, using a pressurized fluid, of vessels using preforms 2 made of thermoplastic material and comprising a body 3 and a neck 6, the body 3 of said preform 2 able to be placed in a molding cavity 4 of a blowing mold 5 belonging to a blowing equipment 1, said equipment 1 further comprising a blowing nozzle 8 having an end 9 shaped in order to be placed in functional sealed relation with the neck 6 of said preform 2 which is protruding from the upper surface 7 of said mold 5, method comprising at least the following steps of:

placing the preform 2 in the blowing mold 5;
sealingly attaching the blowing nozzle 8 with the neck 6 of the preform 2;
blowing the preform 2;
sealingly unfastening of the nozzle 8 with the neck 6 of the blown vessel;
degassing of the blowing fluid in a closed inner volume 13 formed around the neck 6 of the protruding recipient of the upper surface 7 of the blowing mold 5;
discharging of the blowing fluid towards the exterior from the closed inner volume 13;
transferring the blown vessel outside of the blowing mold;
method comprising an additional step which consists in passing the blowing fluid, during degassing, through discharging channels 28 formed in said blowing mold 5 and, then, allowing the fluid to escape towards the atmosphere.

The method according to the invention further comprises a step of forming the inner closed volume 13 by the displacement of a body 14, 16, coaxial to said blowing nozzle 8, body comprising a substantially planar radial crown 18 having protruding means of sealing 19 able to bear tightly on the upper surface 7 of the mold 5, this thanks to which the inner volume of the means of degassing, of discoidal shape, is delimited: —by said radial crown 18, —by said means of sealing 19 in the form of a skirt 20 and, —by said upper surface 7 of the mold.

The invention claimed is:

1. Blowing equipment, using a pressurized fluid, of vessels using preforms made of thermoplastic material, and comprising a body and a neck, said equipment comprising a blowing mold with a molding cavity wherein is able to be placed said body of a preform, said mold having an upper surface from which is able to protrude the neck of said preform once the body of the latter is placed in said molding cavity, said equipment further comprising a nozzle with an end shaped in order to be placed in functional sealed relation with said neck of the protruding preform, said end of nozzle being attached to the means of degassing of the blowing fluid capable of bearing tightly on said upper surface of the mold by forming an inner volume wherein the blowing fluid blown under pressure in the preform is able to be discharged after the blowing operation of the preform, wherein it comprises means of degassing which consist in an arrangement making it possible to carry out an expansion of the blowing fluid around the blowing cavity, arrangement consisting in a plurality of channels arranged around said blowing cavity, channels being provided with a side opening in said inner volume of said means of degassing, and on the other side in an annular channel which allows for the discharging towards the atmosphere.

2. Blowing equipment according to claim 1, wherein the means for degassing have the form of a body comprising a substantially cylindrical central section surrounding in a sealed manner the end of the nozzle and a radial planar crown having protruding means of sealing able to bear tightly on the upper surface of the mold, and this thanks to which the inner volume of said degassing means, of discoidal shape, is delimited by said radial crown, by said sealing means and by said upper surface of the mold.

3. Blowing equipment according to claim 2, wherein the means of degassing include sealing means capable of bearing on the upper surface of the mold, sealing means having the form of a sealing skirt made from an elastic material.

4. Blowing equipment according to claim 1, wherein it comprises means of degassing able to be displaced axially using means of controlling in order to form the sealed volume according to the sealed fastening of the nozzle with the neck of the preform.

5. Blowing equipment according to claim 4, wherein the means of controlling have the form of a cylinder or the form of a cam and of a bearing roller able to be displaced on said cam.

6. Blowing equipment according to claim 1, wherein the discharging channels are regularly hollowed in the blowing mold concentrically to the X-X blowing axis of the nozzle.

7. Blowing equipment according to claim 1, wherein the annular channel, in which open the discharging channels, is formed in the bottom of the blowing mold.

8. Blowing equipment according to claim 1, wherein the annular channel is connected to a discharging conduit of the blowing fluid comprising a discharge silencer device.

9. Method for blowing using a pressurized fluid of vessels using preforms made of thermoplastic material and comprising a body and a neck, the body of said preform able to be placed in a molding cavity of a blowing mold belonging to a blowing equipment, said equipment further comprising a blowing nozzle having an end shaped in order to be placed in functional sealed relation with said neck of a preform which is protruding from an upper surface of said mold, said method comprising at least the following steps of:
  placing said preform in said blowing mold;
  sealingly attaching the blowing nozzle with the neck of the preform;
  blowing the preform;
  sealingly unfastening of the nozzle with the neck of the blown vessel;
  degassing of the blowing fluid in an inner closed volume formed around the neck of the vessel protruding from the upper surface of the blowing mold;
  discharging of the blowing fluid towards the exterior from the closed inner volume;
  transferring the blown vessel outside of the blowing mold;
  wherein it comprises an additional step of passing the blowing fluid through discharging channels formed in said blowing mold, before said step of discharging of the fluid towards the atmosphere, discharging being carried out using an annular channel wherein open the channels and by a conduit provided with a discharge silencer device.

10. Method for blowing according to claim 9, wherein it comprises a step of forming an inner closed volume by means of a substantially planar radial crown having protruding sealing means able to bear tightly on the upper surface of the mold, and this thanks to which said inner volume, of discoidal shape, is delimited by said radial crown, by said sealing means and by said upper surface of the mold.

11. Blowing equipment according to claim 3, wherein the elastic material is either rubber or polyurethane.

* * * * *